United States Patent
Hawkins

(10) Patent No.: US 8,583,105 B2
(45) Date of Patent: Nov. 12, 2013

(54) SYSTEM AND METHOD FOR A PERSONAL PHONE EXTENSION

(75) Inventor: Johnny D. Hawkins, Kansas City, MO (US)

(73) Assignee: CenturyLink Intellectual Property LLC, Denver, CO (US)

( * ) Notice: Subject to any disclaimer, the term of this patent is extended or adjusted under 35 U.S.C. 154(b) by 1058 days.

(21) Appl. No.: 12/012,133

(22) Filed: Jan. 31, 2008

(65) Prior Publication Data

US 2009/0196411 A1   Aug. 6, 2009

(51) Int. Cl.
*H04W 12/06*   (2009.01)
*H04W 92/02*   (2009.01)
*H04W 60/00*   (2009.01)

(52) U.S. Cl.
USPC .............. 455/426.1; 455/411; 455/435.1; 455/566; 347/211.02; 347/211.03

(58) Field of Classification Search
USPC ............... 455/426.1, 411, 435.1, 566; 379/211.02, 211.03
See application file for complete search history.

(56) References Cited

U.S. PATENT DOCUMENTS

| | | | |
|---|---|---|---|
| 6,434,394 B1 * | 8/2002 | Grundvig et al. | 455/463 |
| 6,574,470 B1 * | 6/2003 | Chow et al. | 455/417 |
| 8,036,362 B1 * | 10/2011 | Skinner | 379/211.02 |
| 2005/0197061 A1 * | 9/2005 | Hundal | 455/41.2 |
| 2006/0193301 A1 * | 8/2006 | Cheng et al. | 370/338 |
| 2007/0123256 A1 * | 5/2007 | Whitesell et al. | 455/435.1 |
| 2007/0206566 A1 * | 9/2007 | Bennett | 370/352 |
| 2007/0243898 A1 * | 10/2007 | Eyre et al. | 455/552.1 |

* cited by examiner

*Primary Examiner* — Steven S. Kelley
*Assistant Examiner* — Andy Gu
(74) *Attorney, Agent, or Firm* — Swanson & Bratschun, L.L.C.

(57) ABSTRACT

A system and method for implementing extensions for a cordless telephone system. A menu configured to receive user input is displayed to a user for setting a configuration for routing incoming communications of the cordless telephone system to one or more of a plurality of handsets. An identifier of a caller is associated with one or more handsets based on the user input. The handsets wirelessly communicate through a base station utilizing a singe phone number. A call is routed to the one or more of the handsets in response to determining the identifier is associated with the call.

20 Claims, 6 Drawing Sheets

FIG. 6

| | Graphical User Interface | 600 |
|---|---|---|
| Base Station: <br> 602 | Ext. 1 – Office: <br> 604 | Ext. 2 – Family Room: <br> 606 |
| 1-214-999-9999 <br> Wayne, John <br> 1-214-999-9996 <br> Area Code 469 <br> 208.13.3.485 <br> 608 | 1-214-999-9995 <br> Eastwood, Clint <br> 1-214-999-9999 <br> 128.13.3.123 <br> 128.13.3.126 <br> Area Code 307 <br> 610 | 1-214-999-9992 <br> Gump, Forest <br> 1-214-999-9996 <br> 208.13.3.485 <br> Area Code 469 <br> 612 <br> ☑ Ring twice and then all <br> ☑ Enable call privacy |

SYSTEM AND METHOD FOR A PERSONAL PHONE EXTENSION

BACKGROUND OF THE INVENTION

Description of the Related Art

The growth in communications related technology has increased nearly exponentially in recent years. The growth is fostered by enhanced technology, hardware, software, protocols, and communication standards. In some cases, users have become accustomed to the services and features commercially provided by wireless and telecommunications service providers. For example, these services and features may be provided as business services through a user's employer.

These services are often implemented by expensive and complex servers, switches, and commercial hardware. As a result, many individual users are unable to implement similar services at home or for other small use applications without specifically ordering those services, adding additional lines, or otherwise incurring exorbitant expenses. In particular, many users may receive all calls for a home or business on a single telephone. Implementing a multiple line or multiple extension communications system or service is too cost prohibitive and complex for most users.

BRIEF SUMMARY OF THE INVENTION

One embodiment includes a system and method for implementing extensions for a cordless telephone system. A menu configured to receive user input may be displayed to a user for setting a configuration for routing incoming communications of the cordless telephone system to one or more of a plurality of handsets. An identifier of a caller may be associated with one or more handsets based on the user input. The handsets may wirelessly communicate through a base station utilizing a singe phone number. A call may be routed to the one or more of the handsets in response to determine the identifier is associated with the call.

Another embodiment includes a cordless telephone system. The system may include a plurality of handsets configured to allow voice conversations. The system may further include a base station in wireless communication with the handsets within a range of less than five hundred feet. The handsets and the base station may display a menu to a user, receive user input for setting a configuration for routing incoming communications, associate an identifier of a caller with one or more of the handsets based on the user input, and route a call to the one or more of the handsets in response to determining the identifier is associated with the call.

Yet another embodiment includes a cordless telephone. The cordless telephone may include a processor for executing a set of instructions. The cordless telephone may also include a memory for storing the set of instructions. The set of instructions may be configured to display a menu to a user for receiving user input for setting a configuration for routing incoming communications, associate an identifier of a caller with one or more of a number of handsets based on the user input, wherein the number of handsets wirelessly communicate through a base station utilizing five or less phone numbers, and route a call to the one or more of the number of handsets in response to determining the identifier is associated with the call.

BRIEF DESCRIPTION OF THE DRAWINGS

Illustrative embodiments of the present invention are described in detail below with reference to the attached drawing figures, which are incorporated by reference herein and wherein:

FIG. 6 is a flowchart of a graphical user interface for display by a cordless telephone system in accordance with an illustrative embodiment.

DETAILED DESCRIPTION OF THE INVENTION

Illustrative embodiments of the present invention provide a system and method for utilizing a cordless telephone system for extension communication. In particular, the cordless telephone system may be used to link identifiers associated with a caller to one or more handsets of a cordless telephone system. Incoming calls are directed to one or more of the handsets based on the pre-established associations.

In one embodiment, the cordless telephone system may include any number of handsets that wirelessly communicate with a base station. A user may link an identifier, such as a phone number, name, IP address, username or account number with a calling party using the cordless telephone system. As a result, anytime the calling party calls the user, the identifier is extracted from the call information and only associated or linked handsets ring based on the incoming call or communication. For example, the user may specify that a call from John Smith is to ring or be connected only to handsets 1 and 3 which may be named the base station and the office telephone for purposes of communication. Anytime a call is received and an identifier associated with John Smith is determined or identified, only the base station telephone and the office telephone ring.

The illustrative embodiments allow a family or business utilizing multiple handsets linked to a single base station to easily route calls to each of the handsets based on user input. In effect, the cordless telephone system functions as a virtual system for enabling automatic extensions from a single number. The user input may be provided using a graphical user interface or menu displayed by any of the handsets or the cordless base station. As a result, calls and other communications incoming to the cordless telephone system are more effectively routed to the desired user. Similarly only specified handsets ring based on an incoming call rather than ringing all handsets indiscriminately. The cordless telephone system may be a telephone system inexpensively purchased for consumer applications. In one embodiment, the cordless telephone system shares a single phone number and corresponding communications connection that is linked to the base station for enabling voice communication from the base station or any of the handsets that wirelessly communicate with the base station.

Figure 1:
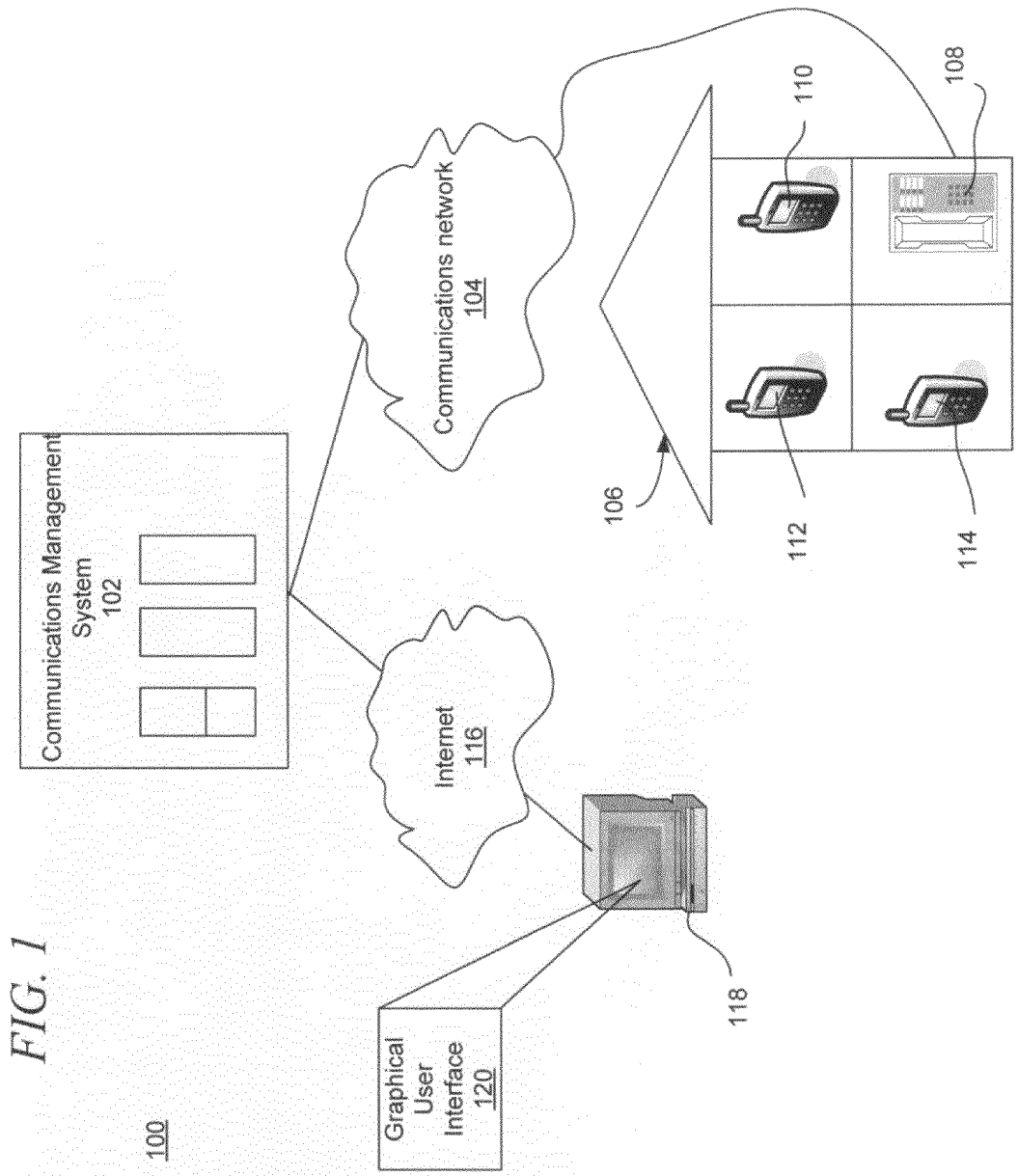
FIG. 1 is a pictorial representation of a communications system in accordance with an illustrative embodiment.

FIG. 1 is a pictorial representation of a communications system in accordance with an illustrative embodiment. The communication system 100 in FIG. 1 may include various elements including a communications management system 102, a communications network 104, a home 106, base station 108, handsets 110, 112 and 114, Internet 116, client 118, and graphical user interface (GUI) 120.

The communications management system 102 is a system configured to control communications through the communications network 104 and receive input and information and communications through the Internet 116. The communications management system 102 may be one or more devices including a category 5 switch, a router, a server and any other communications devices that may be used in the communications network 104. The communications network 104 may be a digital, analog, packet, wireless, wire line, VOIP communications network or a combination of network types. As shown, the communications network 104 communicates with the base station 108 through a wired connection. However, the communications network 104 may communicate with the base station 108 using a fiber optic, twisted pair, Ethernet, analog, digital, wireless signal, or other communications line or link suitable for enabling voice communications.

The base station 108 and the handsets 110, 112 and 114, may be part of a single cordless telephone system A cordless telephone system or a portable telephone system is a telephone with one or more wireless handsets that communicates through radio waves with the base station 108. The base station 108 may be connected to a fixed telephone line, a WiFi or WiMAX, connection, or other communications line, connection, or link suitable for communicating voice signals. The handsets 110, 112 and 114 may communicate with the base station 108 within a limited range of the base station 108. The base station 108 and each of the handsets 110, 112 and 114 may include a handset cradle. The base station 108 is located on the subscriber premises as shown in this illustrative embodiment as the home 106. The home 106 may also be a business, enterprise, organization or other building or collective group of individuals that share living, working or a community space. The home 106 does not necessarily define a building, but rather a space in which the cordless phone system is utilized.

The base station 108 attaches and communicates with the communications network 104 which may be a telephone network in the same way a corded telephone or wireline telephone communicates with a telephone network. The base station and the handsets 110, 112 and 114 may use any number of cordless telephone standards, such as, personal handyphone systems (PHS) or digital enhanced cordless telephone telecommunications (DECT). The base station 108 may include a handset, as well as the base functionality and coordinating hardware and software that enable the handsets 110, 112 and 114, as well as the base station 108 to communicate through the communications network 104. The base station 108 may require electricity to be powered, whereas the handsets 110, 112 and 114 may be battery powered and rechargeable when sitting in a cradle at the base station 108 or other available cradles.

The cordless telephone system may use any number of frequencies to communicate with the handsets 110, 112 and 114. In particular, these frequencies may include 1.7 MHz, 27 MHz, 43-50 MHz, 900 MHz, 1.9 GHz, 2.4 GHz and 5.8 GHz. Each of which may include multiple channels. The cordless telephones typically have distance limitations of less than five hundred feet even though the range may vary based on the available frequency. The cordless telephone system may also utilize any number of frequencies, standards and protocols allocated in the future by the Federal Communications Commission or allowed by common business practices. The cordless telephone system, including the base station 108 and the handsets 110, 112 and 114 is particularly useful for a large home or businesses in which a user may be unable to reach a single location during a time a phone call or other communication is incoming to the cordless telephone set. As shown, the base station 108 and the handsets 110, 112 and 114 may be located in separate rooms of the home 106. In particular, the handsets 110, 112 and 114 may be so positioned so that family members within the home 106 may each be able to access the cordless telephone system in order to answer incoming communications and make phone calls as needed.

The base station 108 and the handsets 110, 112 and 114 may individually or collectively include the common features of a telephone including buttons, hardware, software and other interface features for enabling voice communications. Each device may include a display or menu that allows a user to provide user input. In one example, the base station 108 and the handsets 110, 112 and 114 may include a liquid crystal display (LCD), touch screen, or buttons that allows a user to associate an identifier of a caller with one or more of the base station 108 and the handsets 110, 112 and 114. For example, using a graphical user interface or menu displayed on the LCD, the user may establish that phone calls from a particular person are to be directed solely to handset 112.

The identifier is information associated with the caller or the calling device. In particular, the identifier may include a phone number, name, IP address, user name, account, nickname or other information that identifies the calling party or caller. Using any of the base station 108 or the handsets 110, 112 and 114, the users of the cordless telephone system may designate which of the handsets 110, 112 and 114 are to ring when a call from a selected party is incoming.

In one example, the handset 110 may be located within a home office of the home 106. As a result, all callers that call the home 106 in order to carry on business enabled through the office may have one or more identifiers associated from their calling devices linked with the handset 110. As those calls are incoming from the base station 108, they are automatically routed to the handset 110. The base station 108 and the handsets 110, 112 and 114 may share a common phone directory and other calling logic that is synchronized between the separate devices. As a result, if a user provides user input using the handset 114, the preferences, user input or other settings are automatically synchronized between the handset 114, the base station 108 and handsets 110 and 112.

An identifier may be linked to one or more of the telephonic devices of the cordless telephone system. For example, the base station 108 and handsets 110 and 112 may be set to ring anytime a call is received from a specified area code, such as 972. In another embodiment, the base station 108 and the handset 114 may ring anytime a communication is received from a particular IP address. The cordless telephone system may be a VOIP telephone system or may be a plain old telephone service (POTS) telephone system. As a result, the connection between the base station 108 and the communications network 104 may be a traditional analog or digital telephone line or a VOIP type connection. The telephone line may enable a single phone number, but no more than five phone numbers to communicate through the cordless telephone system. Calls for each of the five or less lines may be associated with one or more of the handsets 110, 112, and 114.

As shown, the handsets 110, 112 and 114 may be identical to one another but placed in different positions within the home 106 to allow any number of users within the home 106 to communicate through a single communications line or telephone number. The handsets 110, 112 and 114 may be set to include a distinct or user defined ringtone, background, screen setting, handset identification, nickname or avatar.

The cordless telephone system encompassing the base station 108 and the handsets 110, 112 and 114 may also use other features, such as, call blocking, call privacy, call screening, caller identification or other features and services commonly available through VOIP and POTS telephone systems. The identifier may be linked with the handset utilizing any of the base station 108 and the handsets 110, 112 and 114 at any time before, during or after a call to or from a calling party. The users may also specify criteria or other information for specifically routing an incoming communication to one or more of the base station 108 and the handsets 110, 112 and 114.

The Internet 116 may be any type of data network connecting the communications management system 102 and the client 118 using a fiber optic connection, T1, cable, DSL, satellite, high-speed trunk, or other wired or wireless connections. In one embodiment, the methods and systems herein described may be performed by the communication management system 102 based on user feedback and communications with other data and/or communications systems.

Any number of communications protocols may be used to exchange data between the client 118 and the communication management system 102 and the networks encompassed within the communications network 104. In one embodiment, the communications protocol is a common channel signaling system 7 (SS7). SS7 refers to the exchange of information between communications networks and components required to provide and maintain service. The SS7 protocol is used by broadband networks to establish connections between switches and other devices in order to perform call-establishment, billing, routing, and information exchange functions of the wireless network 106. The communications protocol may also be based on transmission control protocol (TCP), Internet protocol (IP), or other commonly-used communications protocols and standards.

The client 118 may be a computing device suitable for displaying the GUI 120 to the user. For example, the client 118 may be a personal computer and the GUI 120 may be integrated or accessible from an application such as a web browser. In another embodiment, the GUI 120 may be a secure client executed by a data processing system to perform the features and tasks described herein. Alternatively, the GUI 120 may be part of a website provided by the communication management system 102 to allow the user to set association identifiers or set preferences.

The communication management system 102 may include a host application or dedicated device for managing communication with one or more remote clients. A user may be required to provide a secure identifier, such as a user name, password, or other authentication code or hardware interface that verifies the user is authorized to make changes within the communication management system 102 before the client 118 is granted access to all or a portion of the host applications. The authentication information may be used to establish a secure connection between the client 118 and the communication management system 102. The secure connection may be a virtual private network tunnel, an encrypted connection, firewall, or other form of secured communications link.

The GUI 120 may be configured to both display and receive information from the user. The GUI 120 may include any number of fields, buttons, icons, and other interfacing elements for display content and receiving user input and selections. In particular, the GUI 120 may display the identifiers linked with one or more of the handsets 110, 112, and 114 and the base station 108. In another embodiment, the user may access the GUI 120 to edit the preferences. The use of extensions or routing controls may be managed by the communications management system 102 based on input received through the GUI 102.

The communications management system 102 may link identifiers with one or more of the handsets 110, 112 and 114 and then subsequently, pass along a control signal or message through the communications network 104 to the base station 108 that subsequently routes the incoming communication to the correct handsets 110, 112 and 114. The client 118 may access the communications management system 102 through the Internet 116 in order to enable a user to configure the calling preferences which may include linking identifiers with each of the handsets 110, 112 and 114.

The cordless telephone system may be expanded at anytime by adding new handsets that communicate with the base station 108. The number of handsets may be unlmited or only limited by the wireless frequencies or channels that may be utilized by the base station to communicate with the handsets 110, 112, 114 and any newly connected handsets.

Figure 2:
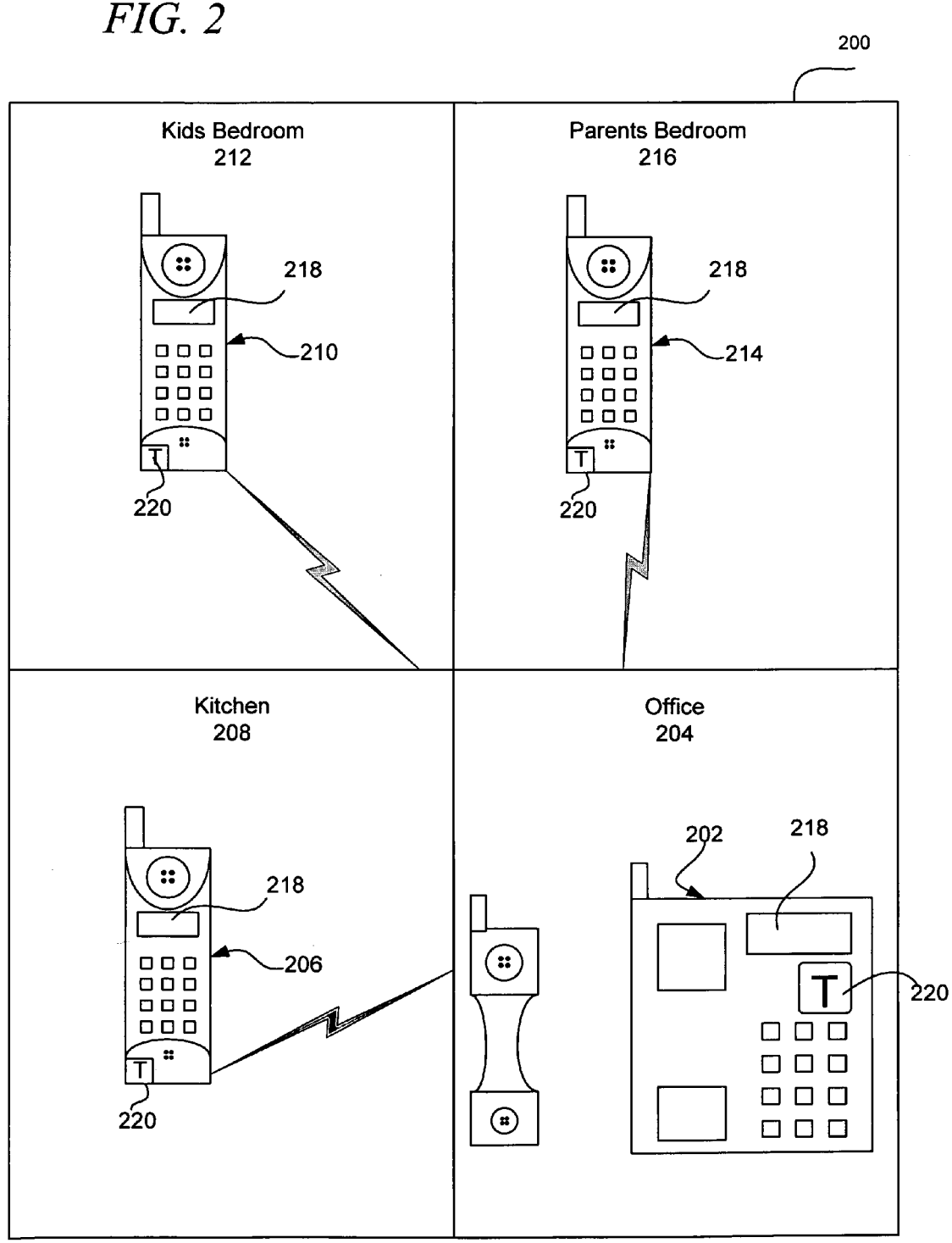
FIG. 2 is a pictorial representation of a cordless telephone system in a home in accordance with an illustrative embodiment.

FIG. 2 is a pictorial representation of a cordless telephone system in a home in accordance with an illustrative embodiment. FIG. 2 is a further embodiment of a cordless telephone system 200. The cordless telephone system 200 is a particular implementation of the base station 108 and the handsets 110, 112 and 114 of FIG. 1. The cordless telephone system may include a base station 202 in an office 204, a handset 206 in a kitchen 208, a handset 210 in a kid's bedroom 212, and a handset 214 in a parent's bedroom 216. Each of the base station 202 and the handsets 206, 210 and 214 may include a display 218 and a call link button 220, in addition to the standard hardware and software utilized by a cordless telephone system 200.

As shown, the cordless telephone system 200 may include any number of handsets and is not limited to any specific number as illustratively shown in FIG. 2. As shown, the cordless telephone system 200 may be distributed between the office 204, the kitchen 208, the kid's bedroom 212 and the parent's bedroom 216. The display 218 of each device may enable the user to view or select which identifiers are linked with one or more of the base station 202, the handsets 206, 210 and 214.

The call link button 220 may be utilized anytime on any of the devices to associate an identifier of a caller with the particular telephonic device including the base station 202 and the handsets 206, 210 and 214. In addition, the call link button 220 may be used to associate caller identification information that is part of the identifier with one or more of the base station 202 and the handsets 206, 210 and 214. For example, all calls from a number associated with the user's bank may be directed to the base station 202 and the handset 214 within the office 204 and the parent's bedroom 216, respectively. The call link button 220 may be activated during a call while the user utilizes the handset 214 to link the identifier with that device. At that same time or later, the user may also associate the base station 202 with the phone number of the bank.

Similarly, calls for children within a family may be automatically directed to the handset 210 in the kid's bedroom 212. As a result, the parents or other members of a family are not bothered by calls incoming to their kid's bedroom that have already been lined to that number. At anytime any of the users may use the handsets 206, 210 and 214 or the base station 202 to review the shared phone directory or to make changes or otherwise review the call configuration settings. In the event, a call does not have a designated identifier or other information, any or all of the base station 202 and handsets 206, 210 and 214 may ring. For example, if the identification information of the call is not recognized by the base station 202, the call may be forwarded to all of the handsets 206, 210 and 214. These preferences may be set by the user for the base station 202 and In another embodiment, if the caller information specifies that the call is blocked, the users may set the cordless telephone system 200 to only ring specified devices, such as the base station 202 and the handsets 206 and 214 within the office 204, kitchen 208 and parent's bedroom 216, respectively. As a result, the handset 210 in the kid's bedroom 212 does not ring when the call is blocked in order to further protect members of the family from a caller that may be unknown or have unknown intentions.

Figure 3:
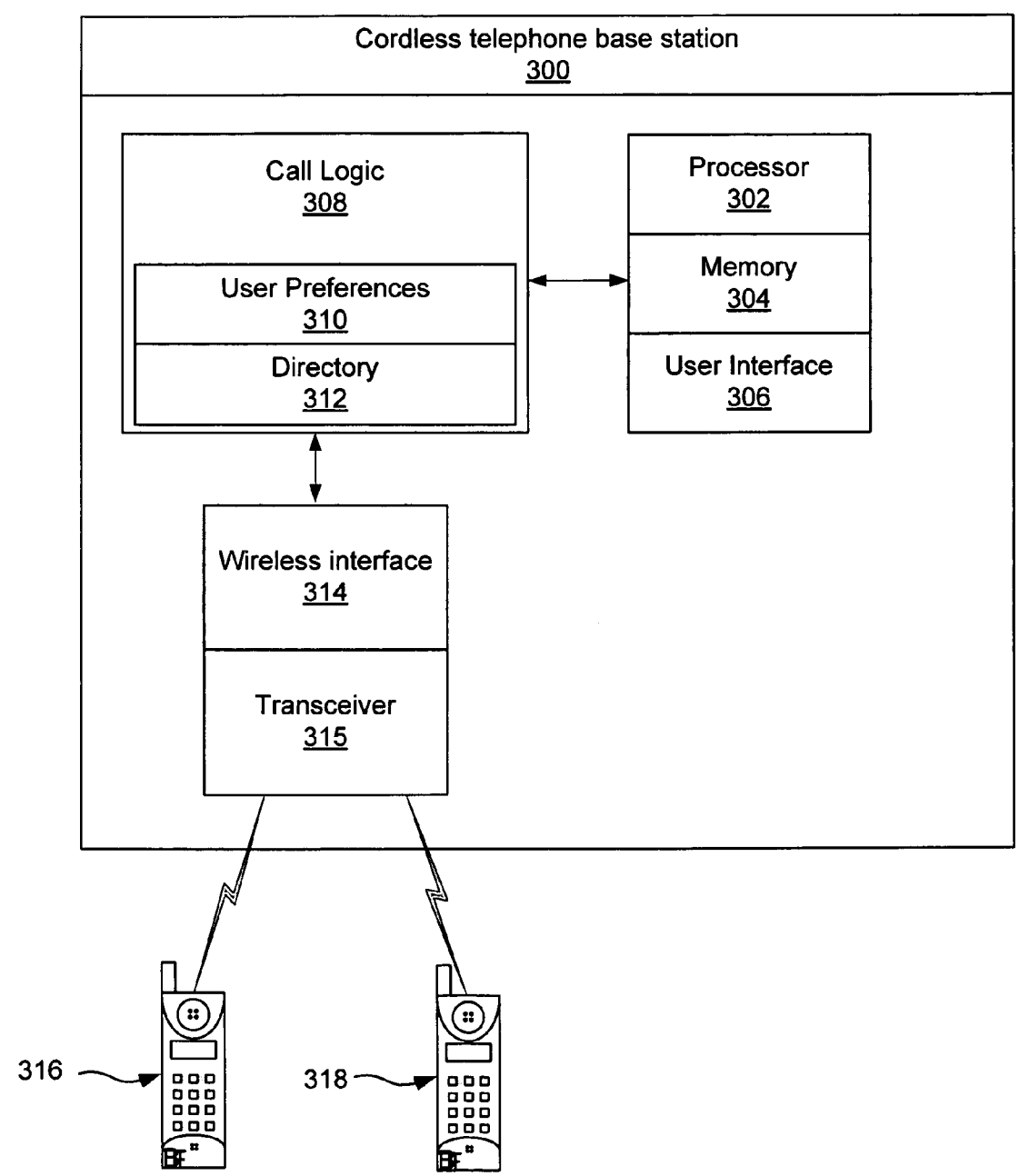
FIG. 3 is a block diagram of a cordless telephone system in accordance with an illustrative embodiment.

FIG. 3 is a block diagram of a cordless telephone system in accordance with an illustrative embodiment. FIG. 3 illustrates one embodiment of a cordless telephone base station 300. The cordless telephone base station 300 may include a processor 302, a memory 304, a user interface 306, call logic 308, user preferences 310, directory 312, wireless interface 314 and transceiver 315. The transceiver 315 of the cordless telephone base station 300 may communicate with any number of handsets including handsets 316 and 318.

The cordless telephone base station 300 may be a combination of hardware and software elements and may be implemented using various structures and implementations. The example shown in FIG. 3 is given for illustration purposes only, and not as a limitation of required elements. The cordless telephone base station 300 may enable the handsets 316 and 318 to act as extensions for the phone number and communications line utilized by the cordless telephone base station.

The processor 302 is a processing device for processing instructions, applications and voice communications. The processor 302 may be a signal processing device or processor utilized by computing devices. The processor 302 may also be any processing device suitable for processing communications signals. In another embodiment, the processor 302 may include other hardware and/or software implementing the extension enabling features of the cordless telephone base station which may include the call logic 308.

The memory 304 is a storage element for storing the instructions for allowing the cordless telephone base station 300 to interface or interoperate with the handsets 316 and 318. In particular, the memory may store instructions for routing calls and linking one or more of the handsets 316 and 318 with an identifier of a caller. The memory 304 may be any static or dynamic memory. In one embodiment, the memory 304 may store the instructions or processes implemented by the call logic 308, user preferences 310, directory 312 and wireless interface 314. In one embodiment, memory 304 may be a storage medium, such as flash memory or dynamic random access memory. However, the memory 304 may be a hard disk, read-only memory, or other suitable form of volatile or nonvolatile memory.

The user interface 306 includes the display device of the cordless telephone base station 300. The user interface 306 may control displaying information, data, text and other content to the user through a display and receiving user input through the display or other interface elements available through the user interface 306. User interface 306 may include any number of buttons, knobs, touch screens, displays, LEDs, indicators or other elements for displaying information to a user and receiving user input.

The call logic 308 is the logic or instructions utilized to implement the call routing to the handsets 316 and 318 as extensions to the cordless telephone base station 300. In particular, the call logic 308 may include user preferences 310. The user preferences are the call preferences or other settings configured by one or more users for linking any number of identifiers with the cordless telephone base station 300 and the handsets 316 and 318. The user preferences 310 may configure how, when and where the cordless telephone base station 300 and the handsets 316 and 318 determine the identifier associated with a call and then subsequently ring or connect to the cordless telephone base station 300 or the handsets 316 and 318.

In one embodiment, the user preferences 310 may specify that a call linked with a particular handset is only rang twice before all of the applicable handsets and the cordless telephone base station 300 ring in order to allow the users to answer the call. In another embodiment, the user preferences 310 may include an order and preferences in which the cordless telephone base station 300 and the handsets 316 and 318 are to ring each of the specified identifiers. The user preferences 310 may also control how the different telephonic devices ring, display information, and are otherwise controlled, managed, or utilized by one or more users.

The directory 312 stores the contact list and caller identification information with individuals that have called the cordless telephone base station 300 and the handsets 316 and 318 or have received calls from the same devices. The directory 312 may be initially entered by a user or may be downloaded from a website server or received through an e-mail, text message or other communication. The directory 312 may show the associations of callers and their corresponding identifiers with each of the cordless telephone base station 300 and the handsets 316 and 318. The directory 312 may be accessible through the user interface 306 and may be updated, reviewed and otherwise configured, based on the information displayed to the user.

The wireless interface 314 and the transceiver 315 send and receive voice communications and control signals between the cordless telephone base station 300 and the handsets 316 and 318. In particular, the wireless interface 314 and transceiver 315 enables a user utilizing the handsets 316 and 318 to send and receive voice signals that are communicated through the cordless telephone base station 300 to a communications network. The wireless interface 314 and transceiver 315 may be configured to synchronize settings between the cordless telephone base station 300 and the handsets 316 and 318 automatically or based on manual user selections. For example, every time an identifier is associated with the handset 316, the association may be automatically updated by sending control signals detailing the association to handset 318 and the cordless telephone base station 300 to enable the updates.

The different components, elements, hardware and software of the cordless telephone base station 300 may be similarly included in the handsets 316 and 318. The directory 312 may be synchronized between the cordless telephone base station 300 and the handsets 316 and 318 based on user updates and changes made. For example, the handset 316 may be used in a lobby of a business and a user may set the handset 316 to update the directory for a specific area code. When calls are received at the cordless telephone base station 300 from the specified area code, the calls are automatically directed to the handset 316 based on the synchronized directory settings and user preferences 310. The cordless telephone base station 300 and the handsets 316 and 318 also include the hardware and software that implements the normal features, functions, and services of the cordless telephone system.

In another embodiment, the cordless telephone base station 300 may receive a control signal from a switch or router. The control signal may detail which devices are to ring based on a previous determination of the applicable identifiers. For example, a router may have previously determined that a call from area code 214 is associated only with handset 318, and as a result a control signal is sent to the cordless telephone base station 300 for processing so that only handset 318 rings as the incoming call is received. The processor 302, memory 304, user interface 306, and call logic 308 as well as the other features of the phone may be utilized to work in conjunction with an externally controlling device. The user may be required to register each handset utilized by the cordless telephone base station 300, associated identifiers, and set user preferences utilizing a client and/or graphical user interface in order to utilize the extension feature available through the cordless telephone base station.

Figure 4:
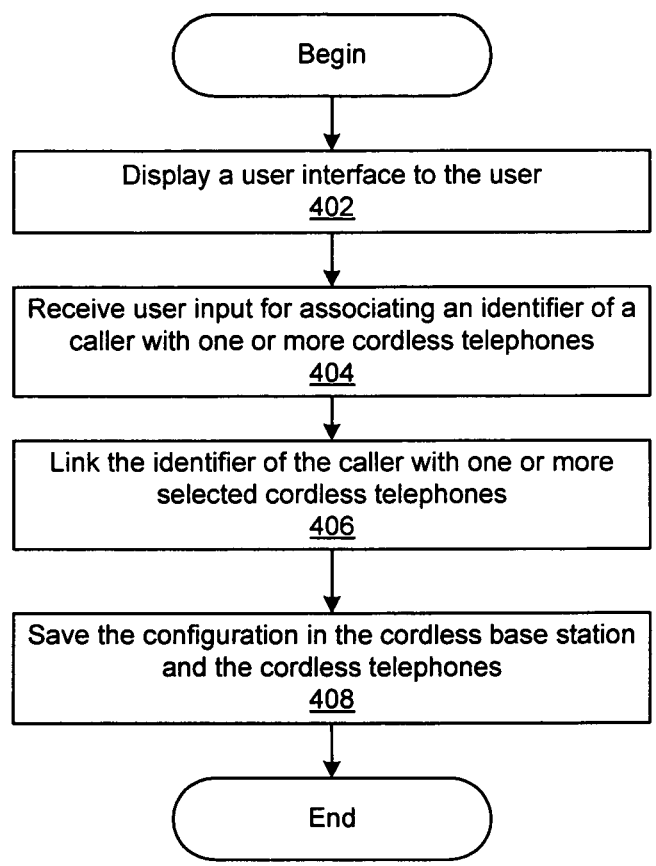
FIG. 4 is a flowchart of a process for configuring a cordless telephone for extension communication in accordance with an illustrative embodiment.

FIG. 4 is a flowchart of a process for configuring a cordless telephone for extension communication in accordance with an illustrative embodiment. The process of FIG. 4 may be implemented by a cordless telephone. The cordless telephone may be the base station or handsets of a cordless telephone system. The process begins by displaying a user interface to the user (step 402). The user interface may be part of a display available through the cordless telephone. In another embodiment, the cordless telephone may be interconnected to a computing device, such as a home computer, for displaying and receiving information for the cordless telephone.

Next, the cordless telephone receives user input for associating an identifier of a caller with one or more cordless telephones (step 404). The user input may be received in any number of ways. In one embodiment, the user may scroll through a directory and automatically associate each of a number of identifiers with one or more of the cordless telephones. In another embodiment, the user may select a button while speaking with the user using a particular handset or cordless telephone to link or associate the identifier and the currently used cordless telephone. The user input may be provided using any number of selection controls or a dedicated button configured to link identifiers with one or more cordless telephones. The cordless telephone specified in step 404 may include the handsets or base station of the cordless telephone system.

Next the cordless telephone links the identifier of the caller with one or more selected cordless telephones (step 406). The identifier and the specified handset may be linked using logic, instructions, a database or other information. For example, a number associated with each telephonic device may be recorded with one or more of the identifiers.

Next, the cordless telephone saves the configuration in the cordless base station and the cordless telephones (step 408). The configuration includes the configuration of a directory and how or when the handsets are dialed as an extension of the base station. Setting different calling configurations, user preferences and other information allows the base station and associated handsets to act as a more complex telephone system, typically controlled by an in-house switch server or other costly or complex communications devices, at a reduced cost.

Figure 5:
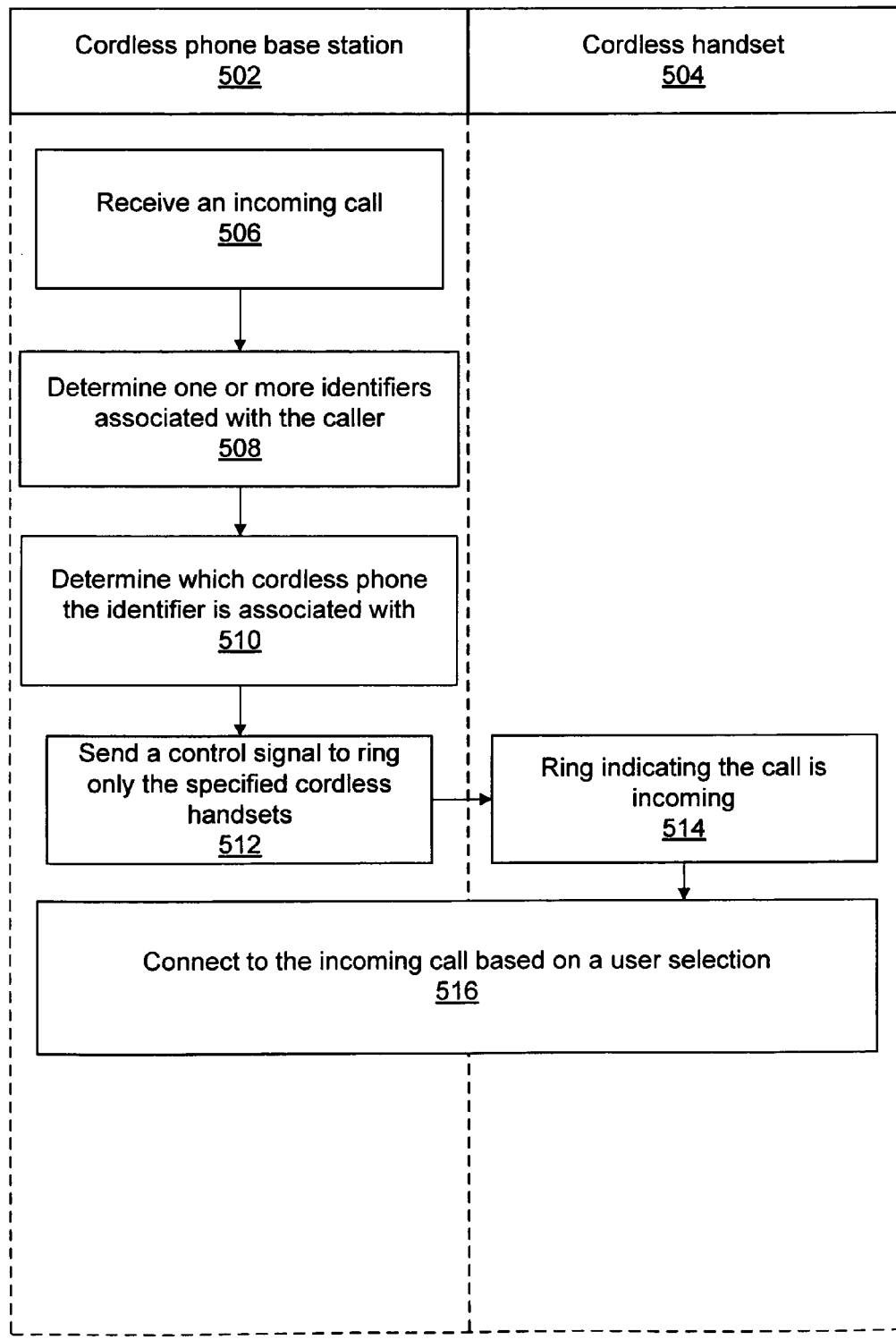
FIG. 5 is a flowchart of a process for communication utilizing a cordless telephone system in accordance with an illustrative embodiment.

FIG. 5 is a flowchart of a process for communication utilizing a cordless telephone system in accordance with an illustrative embodiment. The process of FIG. 5 may be implemented by a cordless telephone base station 502 and a cordless handset 504. The cordless telephone base station 502 may be connected to any number of cordless handsets, but a single cordless handset is shown for illustration purposes.

The process begins with the cordless telephone base station 502 receiving an incoming call (step 506). The incoming call may be received by the cordless telephone base station 502 through a phone line, data connection, or other communications link As previously described the call may be a POTS or VoIP call.

The cordless telephone base station 502 determines one or more identifiers associated with the caller (step 508). The identifiers may be determined from caller identification information, including name and phone number, IP addresses, usernames, account numbers, nicknames, or other information that may be transmitted as part of a call initiation or signaling.

Next, the cordless telephone base station 502 determines which cordless phone the identifier is associated with (step 510). During step 510, the cordless telephone base station 502 determines whether it should receive the call or one or more cordless handsets should be connected to the incoming call. The determination of step 510 is made based on the preconfigured logic, settings, or other information.

Next, the cordless telephone base station 502 sends a control signal to ring only the specified cordless handsets (step 512). The cordless handsets of step 512 may include the cordless telephone base station 502. The cordless handset 504 rings indicating the call is incoming (step 514). The cordless handset 504 rings because the identifier is associated with the cordless handset 504 as previously specified by a user.

Next, the cordless telephone base station 502 and cordless handset 504 connect to the incoming call based on a user selection 516. During step 516 the communications channeled or received through the cordless telephone base station 502 is subsequently wirelessly communicated to the cordless handset 504.

In another embodiment, the control signals may be generated from an externally controlling device, such as a local class 5 switch. The control signal may specify which of the cordless telephones is to ring by performing steps 508, 510, and 512 before passing the call to the cordless telephone base station 502 to ring the cordless handset 504.

FIG. 6 is a flowchart of a graphical user interface for display by a cordless telephone system in accordance with an illustrative embodiment. FIG. 6 illustrates one example of a graphical user interface 600. The graphical user interface 600 may be displayed by one or more elements of the cordless telephone system. The graphical user interface 600 may be a menu or directory listing the associations between the elements of the cordless telephone system. The graphical user interface includes, base station 602, office 604, family room 606, and sections 608, 610 and 612.

Section 608 lists the identifiers associated with the base station 602. The base station may include a wired or cordless handset for enabling communication from the base station 602. The section 608 lists phone numbers, names, IP addresses and area codes associated with the base station 602. In other words, if an identifier from an incoming call is included in the list of section 608, the call is extended or communicated to the base station 602. In one example, this means that the base station 602 rings when the call is received.

The information specified in section 610 links the office 604 with the specified identifiers. The office 604 may be the name of the cordless handset available in an office or as otherwise designated by the user. Similarly, the family room 606 illustrates a cordless handset positioned or named "family room" in accordance with user preferences. Section 612 specifies the identifiers linked with the family room. As can be seen in sections 608, 610 and 612, some of the identifiers are associated with multiple cordless handsets or locations. As a result, if a call is received and linked with that identifier, each of the listed cordless handsets rings. As a result, only specified cordless handsets and the base station may ring based on the configuration of the directory and the identifier associations previously provided.

The graphical user interface 600 may also be utilized to set other associations and preferences. For example, a different ring may be utilized based on the identifier. The graphical user interface 600 may allow a user to set the preferences for the family room 606 so that after two rings, calls designated to the family room 606 ring all applicable cordless telephones. Similarly, call privacy services filtering some incoming calls may be enabled. For example, numbers that are anonymous or blocked may be required to pass through a separate call screening, filter, or message service. The illustrative embodiments may work in conjunction with existing voicemail, answering machine, and calling services and features whether provided by the cordless telephone system, a VoIP switch, class 5 switch, or other applicable communications device.

In one embodiment, if an identifier extracted from the calling information is not linked with any of the elements displayed in the graphical user interface 600, the call may be rang through or connected to each of the devices of the cordless telephone system. In another embodiment, the call may be automatically transferred to voice mail or to a screening service instead of ringing the base station 602, the office 604 and the family room 606.

The previous detailed description is of a small number of embodiments for implementing the invention and is not intended to be limiting in scope. One skill in this art will immediately envisage the methods and variations used to implement this invention in other areas than those described in detail. The following claims set forth a number of the embodiments of the invention disclosed with greater particularity.

What is claimed:

1. A method for implementing extensions for a cordless telephone system, the method comprising:
    displaying, on each of a plurality of handsets and a base station in the cordless telephone system, a menu configured to receive user input for setting a configuration for routing incoming communications of the cordless telephone system to one or more of the plurality of handsets in response to an identifier of a caller and user preferences;
    receiving the user input and user preferences through the menu, wherein the user preferences indicate a number of rings for the plurality of handsets in response to the identifier and an order in which the plurality of handsets are to ring in response to the identifier;
    associating the identifier of the caller with the one or more of the plurality of handsets based on the user input, wherein the user input and user preferences are automatically synchronized between the plurality of handsets and the base station in response to the user input being received, and wherein the plurality of handsets wirelessly communicate through the base station associated utilizing a single phone number; and
    routing a call to the one or more of the plurality of handsets and ringing the one or more of the handsets with the number of rings and in the order in which the plurality of handsets are to ring, according to the user preferences and in response to determining the identifier is associated with the call.

2. The method according to claim 1, wherein the base station is a cordless base station and the plurality of handsets are cordless handsets configured to communicate with the cordless base station using the single phone number, and wherein a directory and the user preferences associating a plurality of identifiers with the one or more of the plurality of handsets is received by the cordless telephone system through a server.

3. The method according to claim 1, wherein associations of a plurality of identifiers associated with each of the plurality of handsets are displayable to the menu accessible by the plurality of handsets and the base station, and wherein the identifier is enabled to be received as a phone number, name, Internet Protocol address, username, account number, and caller identification information.

4. The method according to claim 1, wherein the base station and the plurality of handsets are any of a voice over Internet Protocol telephone and a plain old telephone service telephone.

5. The method according to claim 1, wherein the cordless telephone system is capable of receiving the user input before the call, during the call, and after the call.

6. The method according to claim 2, wherein the server displays a user interface for updating the directory.

7. The method according to claim 1, wherein the plurality of handsets include a dedicated button for associating the identifier with a selected handset.

8. The method according to claim 1, wherein the communications line is configured to receive calls for a single phone number, wherein the base station communicates with the plurality of handsets utilizing one of the frequencies including 1.7 MHz, 27 MHz, 43-50 MHz, 900 MHz, 1.9 GHz, 2.4 GHz and 5.8 GHz.

9. The method according to claim 1, wherein the user preferences specify the number of rings of the call before the call is routed to all or a different set of the plurality of handsets, and the order in which the plurality of handsets are to ring in response to the identifier and the call being unanswered.

10. The method according to claim 1, wherein the routing further comprises:
    ringing only the one or more handsets based on receiving the call which includes the identifier.

11. A cordless telephone system comprising:
    a plurality of handsets configured to allow voice conversations; and
    a base station in wireless communication with the plurality of handsets within a range of less than five hundred feet, wherein the plurality of handsets and the base station:
        display a menu to a user and receive user input through the menu for setting a configuration for routing incoming communications of the cordless telephone system to one or more of the plurality of handsets in response to an identifier of the caller and user preferences, wherein the user preferences indicate a number of rings for the plurality of handsets in response to the identifier and an order in which the plurality of handsets are to ring in response to the identifier;
        associate the identifier of the caller with one or more of the plurality of handsets based on the user input and
        route a call to the one or more of the plurality of handsets and ring the one or more of the handsets with the number of rings and in the order in which the plurality of handsets are to ring, according to the user preferences and in response to determining the identifier is associated with the call;
    wherein the plurality of handsets and the base station share a directory associating a plurality of identifiers with the one or more of the plurality of handsets and storing the user preferences, and wherein the directory and user preferences are automatically synchronized between the plurality of handsets and the base station in response to updates.

12. The method according to claim 11, wherein the plurality of handsets and the base station share a single phone number, wherein the base station is connected to a communications line, and wherein the directory and user preferences associating a plurality of identifiers with the one or more of the plurality of handsets is received by the cordless telephone system through a server.

13. The method according to claim 11, wherein the directory is updatable utilizing a user interface accessed through a server.

14. The method according to claim 11, wherein the directory is capable of being associated with the one or more of the plurality of handsets and updated before, during, and after the call.

15. The method according to claim 11, wherein the plurality of handsets include a dedicated button for associating the identifier with a selected handset.

16. A cordless telephone system comprising:
a processor for executing a set of instructions; and
a memory for storing the set of instructions, wherein the set of instructions are configured to:
display, on each of a plurality of handsets and a base station in the cordless telephone system, a menu for receiving user input for setting a configuration for routing incoming communications to one or more of the plurality of handsets, in response to an identifier of a caller and user preferences
receive the user input and user preferences through the menu, wherein the user preferences indicate a number of rings for the plurality of handsets in response to the identifier and an order in which the plurality of handsets are to ring in response to the identifier;
associate the identifier of the caller with one or more of a plurality of handsets in response to the user input, wherein the configuration is automatically synchronized between the plurality of handsets and the base station in response to the user input being received, and wherein the plurality of handsets wirelessly communicate through the base station utilizing five or less phone numbers; and
route a call to the one or more of the plurality of handsets and ring the one or more of the handsets with the number of rings and in the order in which the plurality of handsets are to ring, according to the user preferences and in response to determining the identifier is associated with the call.

17. The cordless telephone according to claim 16, wherein a directory and user preferences associating a plurality of identifiers with the one or more of the plurality of handsets is received by the cordless telephone system through a server.

18. The cordless telephone according to claim 16, wherein the identifier is enabled to be received as a phone number, name, Internet Protocol address, username, account number, and caller identification information, and wherein the user preferences specify the number of rings of the call before the call is routed to all or a different set of the plurality of handsets, and the order in which the plurality of handsets are to ring in response to the identifier and the call being unanswered.

19. The cordless telephone according to claim 16, wherein associations of a plurality of identifiers associated with each of the plurality of handsets are displayable to the menu accessible by the plurality of handsets and the base station.

20. The cordless telephone according to claim 16, wherein the identifier is capable of being associated with the one or more of the plurality of handsets before, during, and after the call, and wherein the plurality of handsets include a dedicated button for associating the identifier with a selected handset.

* * * * *